United States Patent
Miki

(10) Patent No.: US 11,750,755 B2
(45) Date of Patent: Sep. 5, 2023

(54) INFORMATION PROCESSING APPARATUS, NON-TRANSITORY COMPUTER READABLE MEDIUM, AND INFORMATION PROCESSING METHOD

(71) Applicant: FUJIFILM Business Innovation Corp., Tokyo (JP)

(72) Inventor: Masayoshi Miki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/537,441

(22) Filed: Nov. 29, 2021

(65) Prior Publication Data

US 2023/0050738 A1    Feb. 16, 2023

(30) Foreign Application Priority Data

Aug. 16, 2021  (JP) ................................. 2021-132408

(51) Int. Cl.
H04N 1/00    (2006.01)

(52) U.S. Cl.
CPC ..... *H04N 1/00891* (2013.01); *H04N 1/00323* (2013.01); *H04N 1/00933* (2013.01); *H04N 2201/0094* (2013.01)

(58) Field of Classification Search
None
See application file for complete search history.

(56) References Cited

U.S. PATENT DOCUMENTS 8,786,886 B2    7/2014  Goda
2006/0232812 A1*  10/2006  Shimizu .............. G06Q 10/087
                                                    358/1.14

(Continued)

FOREIGN PATENT DOCUMENTS

JP    2002057827    *  2/2002  ............... H04N 1/00
JP    2004193807    *  7/2004  ............... H04N 1/00

(Continued)

*Primary Examiner* — Beniyam Menberu
(74) *Attorney, Agent, or Firm* — JCIPRNET

(57) ABSTRACT

An information processing apparatus includes a processor configured to: control an operation of the information processing apparatus by executing a control program; in response to reception of an instruction to enter a power-supply off state, determine whether a first power-supply off state is allowed to be entered, the first power-supply off state being a state in which, while a current operation state is held without execution of a restart of the control program, the operation is stopped; in response to a determination result indicating that the first power-supply off state fails to be entered, perform a redetermination after a lapse of a set time, the redetermination determining whether the first power-supply off state is allowed to be entered; and in response to the redetermination determining that the first power-supply off state is allowed to be entered, cause the first power-supply off state to be entered, and, in response to the redetermination determining that the first power-supply off state is not allowed to be entered, cause a second power-supply off state to be entered, the second power-supply off state being a state in which, after the control program is restarted and an initialization process is performed, the operation is stopped.

9 Claims, 11 Drawing Sheets

(56) References Cited

U.S. PATENT DOCUMENTS

| | | | | |
|---|---|---|---|---|
| 2007/0288782 A1* | 12/2007 | Chang | ............... | G06F 1/3296 |
| | | | | 713/323 |
| 2013/0010318 A1* | 1/2013 | Goda | ............... | G06K 15/406 |
| | | | | 358/1.13 |
| 2013/0013947 A1* | 1/2013 | Miyata | ............... | H04N 1/32673 |
| | | | | 713/323 |
| 2014/0119765 A1* | 5/2014 | Hosoda | ............... | G03G 15/5004 |
| | | | | 399/75 |
| 2014/0160516 A1* | 6/2014 | Maruhashi | ......... | H04N 1/00896 |
| | | | | 358/1.14 |
| 2014/0229727 A1* | 8/2014 | Jun | ............... | G06F 1/3206 |
| | | | | 713/2 |
| 2019/0132466 A1* | 5/2019 | Aizono | ............... | H04N 1/00896 |
| 2019/0268337 A1* | 8/2019 | Fujisawa | ............... | G06F 1/3234 |

FOREIGN PATENT DOCUMENTS

| | | | | | |
|---|---|---|---|---|---|
| JP | 2012128705 | | 7/2012 | | |
| JP | 2012155534 | | 8/2012 | | |
| JP | 2013055468 | * | 3/2013 | ............. | Y02D 30/70 |
| JP | 2013186749 | * | 9/2013 | ............... | H04N 1/00 |
| JP | 5885390 | | 3/2016 | | |
| JP | 6041522 | * | 12/2016 | ......... | G03G 15/5016 |
| KR | 20140100502 | * | 8/2014 | ............... | H04N 1/00 |

* cited by examiner

FIG. 3

| | |
|---|---|
| FULL POWER-SUPPLY OFF MODE | POWER SUPPLY OF ALL HARDWARE IS OFF (WHEN POWER SUPPLY SWITCH IS ON, POWER SUPPLY OF ALL HARDWARE IS TURNED ON, AND CPU IS STARTED FROM INITIAL STATE) |
| PARTIAL POWER-SUPPLY OFF MODE | CPU IS SHUT DOWN; HARDWARE RESETTING IS PERFORMED; CPU IS RESTARTED; THEN, ONLY PART OF OS IS STARTED; POWER SUPPLY OF ONLY RAM IS TURNED ON; CPU ENTERS SUSPENDED STATE |
| FAST-STARTUP AVAILABLE MODE | WITHOUT SHUTDOWN OF CPU, POWER SUPPLY OF HARDWARE OTHER THAN RAM IS TURNED OFF, AND CPU ENTERS SUSPENDED STATE |

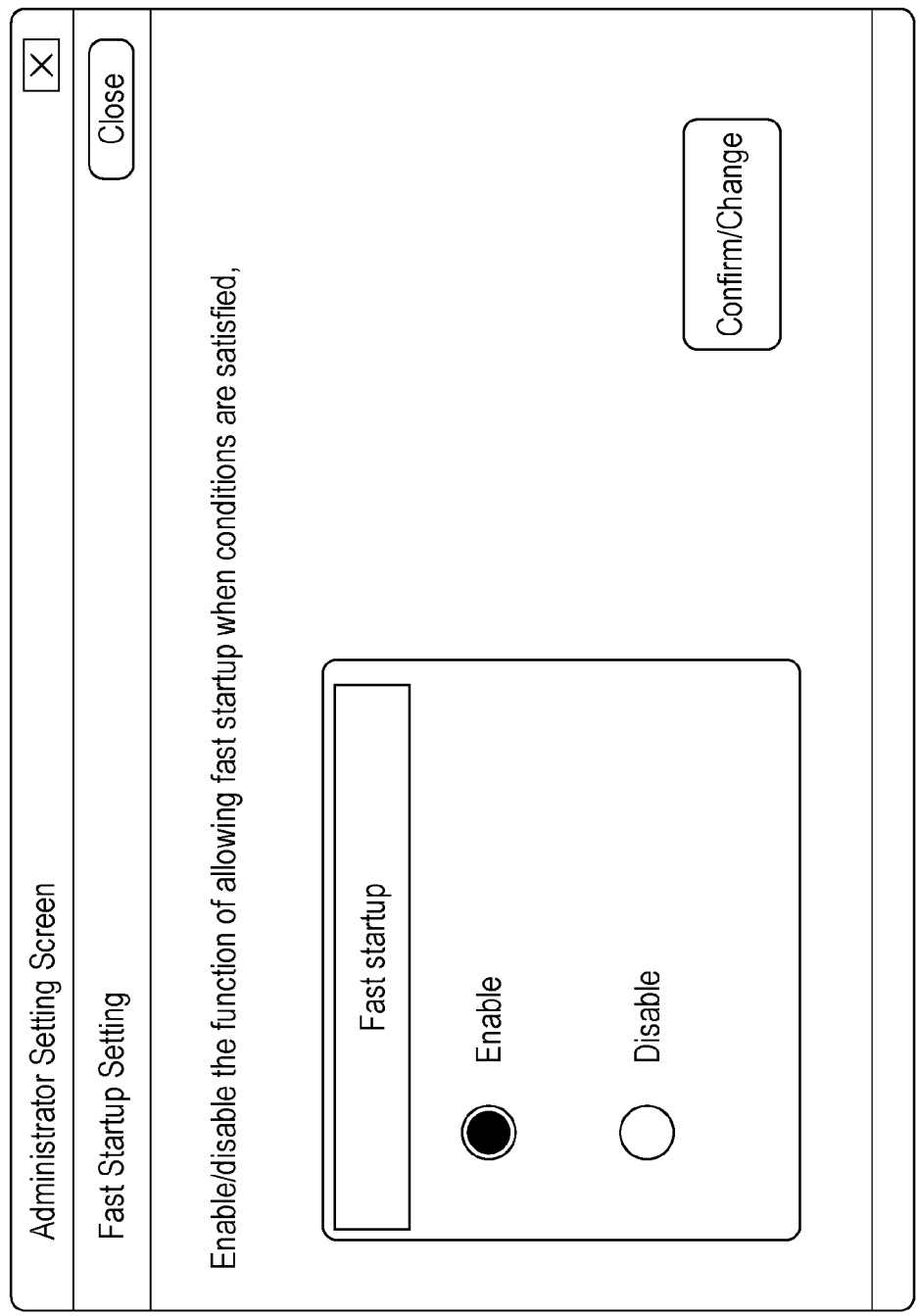

FIG. 11

| REASON WHY TRANSITION FAILS | ACTION PERFORMED WHEN TRANSITION FAILS | STANDBY TIME UNTIL REDETERMINATION | REPETITION COUNT OF REDETERMINATIONS |
|---|---|---|---|
| SHEET TRAY BEING LIFTED | PERFORM REDETERMINATION AFTER WAITING FOR SET TIME | TEN SECONDS | FOUR TIMES |
| IMAGE OUTPUT UNIT BEING SET UP | PERFORM REDETERMINATION AFTER WAITING FOR SET TIME | TWENTY SECONDS | FOUR TIMES |
| FIXING DEVICE BEING WARMED UP | PERFORM REDETERMINATION AFTER WAITING FOR SET TIME | TWENTY SECONDS | FOUR TIMES |
| PACKET BEING RECEIVED OVER NETWORK | PERFORM REDETERMINATION AFTER WAITING FOR SET TIME | THREE SECONDS | SIX TIMES |
| PRINT JOB BEING PERFORMED | PERFORM REDETERMINATION AFTER WAITING FOR SET TIME | THIRTY SECONDS | TEN TIMES |
| OCCURRENCE OF SYSTEM ERROR | PERFORM REDETERMINATION AFTER REBOOTING | — | TWICE |
| ERROR DUE TO OPENED COVER | TURN OFF POWER SUPPLY WITHOUT REDETERMINATION | — | — |

FIG. 12

| WAY OF TURNING OFF POWER SUPPLY | ACTION PERFORMED WHEN TRANSITION FAILS | STANDBY TIME UNTIL REDETERMINATION | REPETITION COUNT OF REDETERMINATIONS |
|---|---|---|---|
| POWER-SUPPLY OFF OPERATION ON OPERATION PANEL | PERFORM NO REDETERMINATION (WHEN "DISABLE" IS SELECTED) | – | – |
| POWER-SUPPLY OFF OPERATION ON OPERATION PANEL | PERFORM REDETERMINATION (WHEN "ENABLE" IS SELECTED) | HALF OF TABLE VALUE | HALF OF TABLE VALUE |
| TIME-DESIGNATED POWER-SUPPLY OFF OPERATION | PERFORM REDETERMINATION AFTER WAITING FOR SET TIME | TABLE VALUE | TABLE VALUE |
| REMOTE POWER-SUPPLY OFF OPERATION | PERFORM REDETERMINATION AFTER WAITING FOR SET TIME | TABLE VALUE | TABLE VALUE |
| USER IS NOT DETECTED BY HUMAN DETECTING SENSOR AFTER POWER-SUPPLY OFF OPERATION ON OPERATION PANEL | PERFORM REDETERMINATION AFTER WAITING FOR SET TIME | TABLE VALUE | TABLE VALUE |

INFORMATION PROCESSING APPARATUS, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2021-132408 filed Aug. 16, 2021.

BACKGROUND

(i) Technical Field

The present disclosure relates to an information processing apparatus, a non-transitory computer readable medium, and an information processing method.

(ii) Related Art

Japanese Patent No. 5885390 discloses an image forming apparatus which performs the following operations. When a power supply switch is turned off, a startup unit performs a reboot. Without adjustment of an image forming unit, the startup unit then causes the image forming apparatus to enter a second power mode in which part of the image forming apparatus is supplied with power.

Japanese Unexamined Patent Application Publication No. 2012-128705 discloses an information processing apparatus which exerts the following control. In response to reception of a request to turn off power supply of the information processing apparatus, whether a restart of the information processing apparatus is necessary is determined from the state of the information processing apparatus. If it is determined that a restart is not necessary, the information processing apparatus is suspended. If it is determined that a restart is necessary, the information processing apparatus is shut down.

Japanese Unexamined Patent Application Publication No. 2012-155534 discloses an electronic device which performs the following operations. In a shutdown process performed when power supply is turned off, the reboot flag is turned on, and a boot process is performed again. In the boot process, when the reboot flag is on, only predetermined processes for restarting the device are performed, and the device enters the power-saving mode. After the device enters the power-saving mode, when a power supply switch is turned on, the power-saving mode is canceled, and the other part of the boot process is performed.

SUMMARY

Aspects of non-limiting embodiments of the present disclosure relate to an information processing apparatus, a non-transitory computer readable medium, and an information processing method. Assume the case in which, when an instruction to enter the power-supply off state is received, either one of a first power-supply off state and a second power-supply off state may be entered. The first power-supply off state is a state in which, while the current operation state is held without a restart of a control program, the operation is stopped. The second power-supply off state is a state in which, after a restart of a control program and execution of an initialization process, the operation is stopped. In this case, the information processing apparatus, the non-transitory computer readable medium, and the information processing method may be more highly likely to cause the first power-supply off state to be entered compared with the case in which, when a reason why the first power-supply off state fails to be entered is present, the second power-supply off state is entered immediately.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a processor configured to: control an operation of the information processing apparatus by executing a control program; in response to reception of an instruction to enter a power-supply off state, determine whether a first power-supply off state is allowed to be entered, the first power-supply off state being a state in which, while a current operation state is held without execution of a restart of the control program, the operation is stopped; in response to a determination result indicating that the first power-supply off state fails to be entered, perform a redetermination after a lapse of a set time, the redetermination determining whether the first power-supply off state is allowed to be entered; and in response to the redetermination determining that the first power-supply off state is allowed to be entered, cause the first power-supply off state to be entered, and, in response to the redetermination determining that the first power-supply off state is not allowed to be entered, cause a second power-supply off state to be entered, the second power-supply off state being a state in which, after the control program is restarted and an initialization process is performed, the operation is stopped.

BRIEF DESCRIPTION OF THE DRAWINGS

Exemplary embodiment of the present disclosure will be described in detail based on the following figures, wherein:

FIG. 3 is a diagram for describing the types of power-supply off state of an image forming apparatus according to an exemplary embodiment of the present disclosure;

FIG. 4 is a diagram illustrating an exemplary display screen on an operation panel, which is used when a setting for enabling/disabling the power-supply off state in the fast-startup available mode is to be set;

FIG. 11 is a diagram illustrating an exemplary redetermination management table; and FIG. 12 is a diagram illustrating an exemplary redetermination parameter modification table.

DETAILED DESCRIPTION

Figure 1:
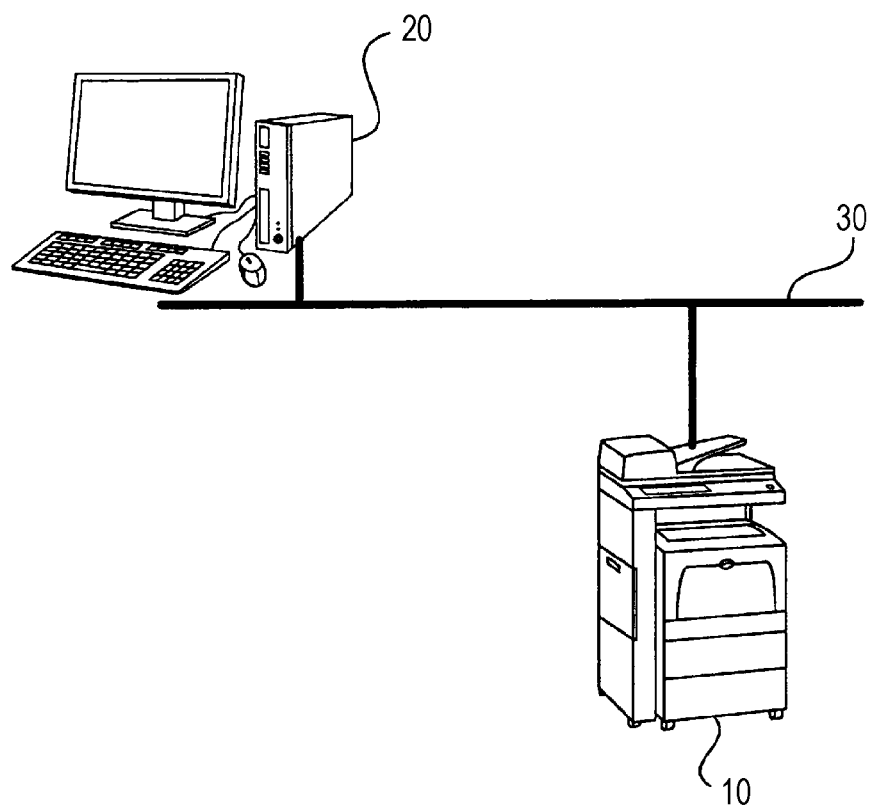
FIG. 1 is a diagram illustrating the system configuration of an image forming system according to an exemplary embodiment of the present disclosure.

An exemplary embodiment of the present disclosure will be described in detail below by referring to the drawings.

FIG. 1 is a diagram illustrating the configuration of an image forming system according to an exemplary embodiment of the present disclosure.

As illustrated in FIG. 1, the image forming system according to the exemplary embodiment of the present disclosure includes an image forming apparatus 10 and a terminal apparatus 20 which are connected to each other over a network 30. The terminal apparatus 20 generates print data and transmits the generated print data to the image forming apparatus 10 over the network 30. The image forming apparatus 10, which receives the print data transmitted from the terminal apparatus 20, outputs images on sheets in accordance with the print data. The image forming apparatus 10 is an apparatus called a so-called multifunction device having multiple functions, such as the print function, the scan function, the copy function, and the fax function.

Figure 2:
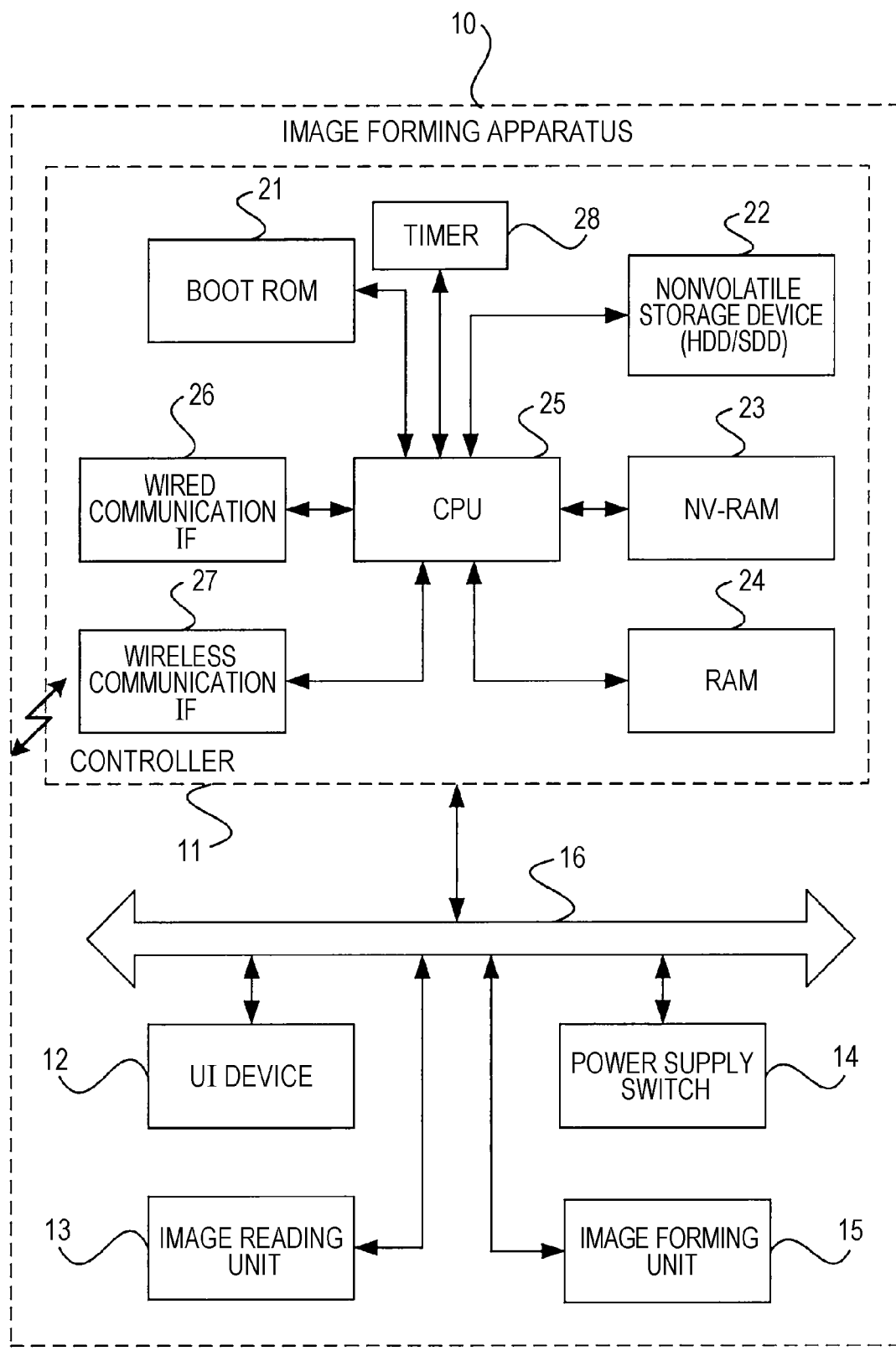
FIG. 2 is a block diagram illustrating the hardware configuration of an image forming apparatus according to an exemplary embodiment of the present disclosure.

FIG. 2 illustrates the hardware configuration of the image forming apparatus 10 in the image forming system according to the present exemplary embodiment.

As illustrated in FIG. 2, the image forming apparatus 10 includes a controller 11, which controls the operations of the entire apparatus, a user interface (UI) device 12, which includes a touch panel or a liquid-crystal display and a keyboard, an image reading unit 13, a power supply switch 14, and an image forming unit 15. These components are connected to each other through a control bus 16.

The controller 11 includes a boot read-only memory (ROM) 21, a nonvolatile storage device 22, which is formed of a hard disk drive (HDD) or a solid state drive (SSD), a nonvolatile random-access memory (NV-RAM) 23, which is a nonvolatile memory such as a flash memory, a random-access memory (RAM) 24, which is a volatile memory, a central processing unit (CPU) 25, a wired communication interface (IF) 26, which receives/transmits data from/to external apparatuses through a wired communication line such as Ethernet™, a wireless communication IF 27, which receives/transmits data from/to external apparatuses through wireless communication lines, such as Bluetooth™ and Wi-Fi™, and a timer 28.

The CPU 25 is a processor which, in a startup, loads a boot program, which is stored in the boot ROM 21, to the RAM 24 to perform a startup process, and which performs predetermined processes on the basis of control programs, which are stored in the NV-RAM 23 or the nonvolatile storage device 22, to control the operations of the image forming apparatus 10. That is, the CPU 25 controls the operations of the image forming apparatus 10 through execution of the predetermined control programs.

The UI device 12, which is, for example, an operation panel formed of a touch panel, displays various types of information to users and receives operations from users. The image reading unit 13 reads document images from documents, which have been set, on the basis of the control performed by the controller 11. The image forming unit 15 outputs images on recording media such as print sheets on the basis of the control performed by the controller 11.

The power supply switch 14 is provided to cause the image forming apparatus 10, which is in the normal operation state, to go into the power-supply off state and to cause the image forming apparatus 10, which is in the power-supply off state, to go into the normal operation state.

The UI device 12 includes another power supply switch on the operation panel. In response to a user's operation on the power supply switch on the operation panel, the operation state of the image forming apparatus 10 is switched between the normal operation state and the power-supply off state.

The types of the power-supply off state of the image forming apparatus 10 according to the present exemplary embodiment will be described by referring to FIG. 3.

In the image forming apparatus 10 according to the present exemplary embodiment, the power-supply off state has three types: the full power-supply off mode; the partial power-supply off mode; and the fast-startup available mode.

Full Power-Supply Off Mode

The power-supply off state in the full power-supply off mode is the state in which power supply of all the pieces of hardware, such as the controller 11, the UI device 12, the image reading unit 13, and the image forming unit 15, is off. In a return from the power-supply off state in the full power-supply off mode to the normal operation state, power supply of all the pieces of hardware is turned on, and the CPU 25 starts up starting from the initialization state. Therefore, until completion of a return from the power-supply off state in the full power-supply off mode to the normal state, the startup time is the longest compared with the other two states.

Partial Power-Supply Off Mode

The power-supply off state in the partial power-supply off mode will be described. When reception of an instruction, in the normal operation state, to turn off power supply is to cause the power-supply off state in the partial power-supply off mode to be entered, the CPU 25 is shut down, and hardware resetting is then performed. Thus, the CPU 25 is restarted. The CPU 25, which has started up by performing a predetermined startup process, starts only a part of the operating system (OS), and turns on power supply of only the RAM 24, which is a volatile memory. Then, the CPU 25 enters the suspended state. Even when the CPU 25 has been executing a control program, the CPU 25 entering the suspended state causes its operation to be stopped at a point in the middle of the execution, and the CPU 25 goes into the energy-saving state. That is, in the power-supply off state in the partial power-supply off mode, the CPU 25 is held in the state in which the CPU 25 has its operation stopped after starting up. Therefore, the return time is reduced compared with the case in which the CPU 25 is restarted in a return to the normal operation state.

In the power-supply off state in the partial power-supply off mode, when the CPU 25, which has been in the suspended state, returns to the normal operation state again, the control program is executed from the point at which the CPU 25 went into the suspended state. Thus, the startup time is shorter than that in the case where the CPU 25 starts up from the power-supply off state in the full power-supply off mode.

However, when the power-supply off state in the partial power-supply off mode is entered from the normal operation state, the CPU 25 is shut down. Thus, the control program is executed again from the beginning, and is initialized.

Thus, the power-supply off state in the partial power-supply off mode is the power-supply off state in which the operation is stopped after the control program is restarted and initialized.

Fast-Startup Available Mode

The power-supply off state in the fast-startup available mode will be described. When reception of an instruction, in the normal operation state, to turn off power supply is to cause the power-supply off state in the fast-startup available mode to be entered, the CPU 25 is not shut down, and power supply of the pieces of hardware other than the RAM 24, which is a volatile memory, is turned off. Thus, the CPU 25 enters the suspended state. That is, the power-supply off state in the fast-startup available mode is the power-supply off state in which, while the current operation state remains without a restart of a control program, the operation is stopped.

Thus, the power-supply off state has three types. When an operation on a power supply switch causes the power-supply on state to be entered from the power-supply off state, a startup from the power-supply off state in the fast-startup available mode has the shortest startup time; a startup from the power-supply off state in the full power-supply off mode has the longest startup time.

When an instruction to enter the power-supply off state is given through an operation on the power supply switch 14, which is formed of hardware, the operation state enters the power-supply off state in the full power-supply off mode from the normal operation state. When an instruction to enter the power-supply off state is given through an operation on the software power supply switch, which is provided on the operation panel implemented in the UI device 12, the operation state enters the power-supply off state in the partial power-supply off mode or the power-supply off state in the fast-startup available mode from the normal operation state.

The reason why the power-supply off state in the full power-supply off mode is entered when the power supply switch 14, which is formed of hardware, is operated is that a user's operation on the power supply switch 14, which is hardware, may indicate the user's firm intention that the image forming apparatus 10 enter the power-supply off state immediately.

In the power-supply off state in the full power-supply off mode, it takes time after a startup until completion of entering the normal operation state. Thus, when the software power supply switch, which is provided on the operation panel and which is used more frequently, is operated, the power-supply off state in the partial power-supply off mode or the power-supply off state in the fast-startup available mode is entered. Therefore, the power-supply off state in the full power-supply off mode will not be described below.

Whether to enable or disable entering the power-supply off state in the fast-startup available mode may be switched on the basis of a user's selection. For example, a display screen as illustrated in FIG. 4 is displayed on the operation panel. Only when a user selects the setting of enabling fast startup, the power-supply off state in the fast-startup available mode may be entered.

As described above, the startup time until a return to the normal operation state is the shortest if the following configuration is employed: in response to an instruction to enter the power-supply off state, the power-supply off state in the fast-startup available mode is entered from the normal operation state; in response to an instruction to enter the power-supply on state, the power-supply state returns from the power-supply off state in the fast-startup available mode to the normal operation state.

However, if the power-supply off state in the fast-startup available mode is always entered in response to an instruction to enter the power-supply off state, a problem may occur depending on the apparatus status.

For example, when the power supply switch on the operation panel is operated to give an instruction to enter the power-supply off state, for example, the power-supply off state in the fast-startup available mode fails to be entered in the following cases: the case in which packet data is being received from a network; the case in which a print job is being performed; the case in which an error such as a paper jam is occurring; the case in which the image forming unit 15 is being warmed up or set up; and the case in which a specific process, such as an encryption process or a diagnosis process on a malfunction site, is being performed.

The reason is as follows. When the power-supply off state in the fast-startup available mode is entered, the CPU 25 does not restart a control program, and enters the suspended state. When the power-supply on state is entered, the process is restarted in the previous state having been held. In contrast, power supply of the peripheral hardware devices is temporarily interrupted, and is then turned on again to restart the devices. Thus, the peripheral hardware devices fail to perform normal processes.

For example, assume the case in which, when a print process is being performed, a user operates the power supply switch on the operation panel to give an instruction to enter the power-supply off state. In this case, when a return to the normal operation state is made after the power-supply off state in the fast-startup available mode is entered, the CPU 25 immediately restarts its operation although the hardware such as the image forming unit 15, whose power supply has been turned on again, is restarting. Thus, an error may occur in the print process.

Depending on the apparatus configuration of the image forming apparatus 10, the power-supply off state in the fast-startup available mode may fail to be entered in the first place.

For example, the power-supply off state in the fast-startup available mode fails to be entered in the following cases: the case where a wireless communication line, such as Bluetooth™ or Wi-Fi™, is enabled; the apparatus is connected to a personal computer (PC) through a Universal Serial Bus (USB) cable; the case where a user has set such a setting that entering the power-supply off state in the fast-startup available mode is disabled; the case where an error is occurring due to a paper jam or an opened door.

However, when the power-supply off state in the partial power-supply off mode is entered, the CPU 25 is shut down and restarts a control program. Thus, all the states are initialized. Therefore, even in such a state that the power-supply off state in the fast-startup available mode fails to be entered, no problems occur if, after a process, which is being performed, is stopped and the power-supply off state in the partial power-supply off mode is then entered, the power supply switch is operated again to return to the normal operation state.

Therefore, when the power supply switch is operated to give an instruction to enter the power-supply off state, it is determined whether conditions for allowing the power-supply off state in the fast-startup available mode to be entered are satisfied. Only when the conditions are satisfied, the power-supply off state in the fast-startup available mode is entered.

Thus, when a user gives an instruction to enter the power-supply off state, depending on the operation state of the apparatus, the power-supply off state in the partial power-supply off mode is to be entered in some cases so that the power-supply off state is entered with a control program being restarted.

That is, in response to reception of an instruction to enter the power-supply off state, the CPU 25 exerts the following control: in accordance with a determination result indicating whether the power-supply off state in the fast-startup available mode is allowed to be entered on the basis of the state of the apparatus, the power-supply off state in the fast-startup available mode or the power-supply off state in the partial power-supply off mode is entered.

The overview of the determination process, which is performed by the CPU 25 on the basis of such control when an instruction to enter the power-supply off state is given, will be described by referring to the flowchart in FIG. 5.

In response to an instruction to enter the power-supply off state, in step S101, the CPU 25 determines whether the current state of the apparatus hiders the power-supply off state in the fast-startup available mode from being entered, as described above. Thus, the CPU 25 determines whether a transition to the power-supply off state in the fast-startup available mode is allowed.

In step S101, if the CPU 25 determines that a transition to the power-supply off state in the fast-startup available mode is allowed, in step S102, the CPU 25 performs a transition process of transitioning to the power-supply off state in the fast-startup available mode, and causes the power-supply off state in the fast-startup available mode to be entered.

In step S101, if the CPU 25 determines that a transition to the power-supply off state in the fast-startup available mode is not allowed, in step S103, the CPU 25 performs a transition process of transitioning to the power-supply off state in the partial power-supply off mode, and a transition to the power-supply off state in the partial power-supply off mode is made.

The transition process, in which the CPU 25 causes a transition to the power-supply off state in the fast-startup available mode to be made and which is illustrated in step S102 in the flowchart in FIG. 5, will be described in detail by referring to the flowchart in FIG. 6.

In a transition to the power-supply off state in the fast-startup available mode, in step S201, power supply of the pieces of hardware other than the RAM 24 in the controller 11 is turned off. In step S202, the CPU 25 transitions to the suspended state. Thus, the image forming apparatus 10 enters the power-supply off state in the fast-startup available mode.

Figure 7:
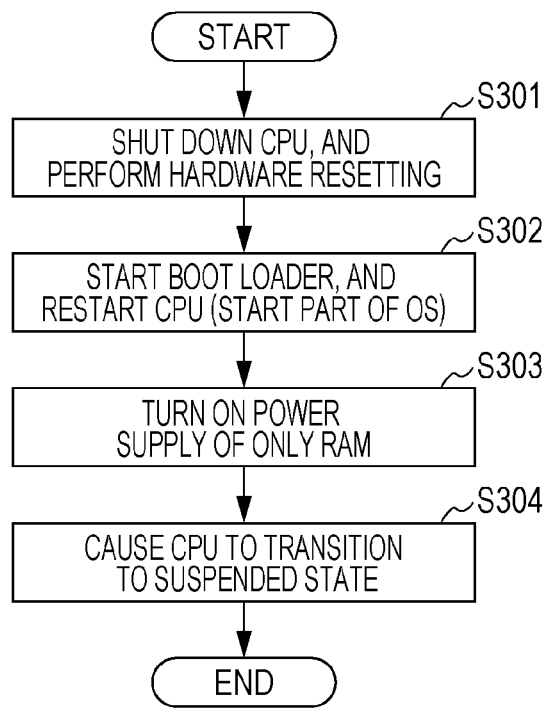
FIG. 7 is a flowchart for describing details of a transition process which is illustrated in the flowchart in FIG. 5 and which is performed when the CPU causes a transition to the power-supply off state in the partial power-supply off mode to be made.

The transition process, in which the CPU 25 causes a transition to the power-supply off state in the partial power-supply off mode to be made and which is illustrated in step S103 in the flowchart in FIG. 5, will be described in detail by referring to the flowchart in FIG. 7.

When the power-supply off state in the partial power-supply off mode is to be entered, in step S301, the CPU 25 is shut down, and hardware resetting of the controller 11 is performed.

In step S302, a boot loader starts up and the CPU 25*b* is restarted. Only a part of the OS is started up.

After that, in step S303, in the controller 11, power supply of only the RAM 24 is turned on. In step S304, the CPU 25 transitions to the suspended state. The image forming apparatus 10 enters the power-supply off state in the partial power-supply off mode.

Thus, assume the case in which setting of fast startup is enabled, and in which a user operates the power supply switch to give an instruction to enter the power-supply off state. In this case, the following control is exerted: if specific conditions are satisfied, the power-supply off state in the fast-startup available mode is entered; if the specific conditions are not satisfied, the power-supply off state in the partial power-supply off mode is entered.

The specific conditions for determining whether the power-supply off state in the fast-startup available mode is allowed to be entered encompass configuration conditions, which are defined by the apparatus configuration itself, and dynamic conditions, which are defined by the current state of the apparatus.

As described above, the configuration conditions are conditions, such as a condition that a wireless communication line is not enabled. The configuration conditions are conditions which do not change as long as the apparatus configuration itself is not changed. The dynamic conditions are conditions which change in a short time, such as a condition that a sheet tray is not being lifted, a condition that packet data is not being received over a network, a condition that various jobs such as a print job are not being executed, a condition that an error has not occurred, and a condition that an image output unit is neither being warmed up nor being set up.

Even when, at the time of reception of an instruction to enter the power-supply off state, the power-supply off state in the fast-startup available mode fails to be entered because the dynamic conditions are not satisfied, the dynamic conditions may be satisfied after a lapse of a short time.

Therefore, when the CPU 25 according to the present exemplary embodiment receives an instruction to enter the power-supply off state, the CPU 25 performs the following operations. The CPU 25 determines whether the power-supply off state in the fast-startup available mode is allowed to be entered. Even when the CPU 25 determines that the power-supply off state in the fast-startup available mode fails to be entered, after a lapse of a set time, the CPU 25 redetermines whether the power-supply off state in the fast-startup available mode is allowed to be entered. If the CPU 25 determines that the power-supply off state in the fast-startup available mode is allowed to be entered in the redetermination, the CPU 25 causes the power-supply off state in the fast-startup available mode to be entered. If the CPU 25 determines that the power-supply off state in the fast-startup available mode is not allowed to be entered in the redetermination, the CPU 25 causes the power-supply off state in the partial power-supply off mode to be entered.

While the CPU 25 waits for elapse of a set time and then redetermines whether the power-supply off state in the fast-startup available mode is allowed to be entered, the illumination of the UI device 12 is turned off, and power supply of the peripheral devices, such as the image reading unit 13 and the image forming unit 15, are also turned off. Therefore, it appears to a user that the image forming apparatus 10 has already been in the power-supply off state.

When the reason why the power-supply off state in the fast-startup available mode fails to be entered is a reason which is addressed over time, the CPU 25 may perform a redetermination. For example, when packet data is being received over a network coincidentally at the time of reception of an instruction to enter the power-supply off state, reception of the packet data may be finished after a lapse of a few seconds. This may allow the power-supply off state in the fast-startup available mode to be entered. Therefore, for example, if, after a lapse of a few seconds, it is determined again whether the power-supply off state in the fast-startup available mode is allowed to be entered, the determination result may indicate that the transition is allowed.

Further, the CPU 25 may repeatedly redetermine, multiple times, whether the power-supply off state in the fast-startup available mode is allowed to be entered, when a repeated set interval of time has elapsed.

Further, the CPU 25 may set a time, which elapses until a redetermination, in accordance with the type of the reason why the power-supply off state in the fast-startup available mode is not allowed to be entered. For example, as described above, assume the case in which the reason why the power-supply off state in the fast-startup available mode is not allowed to be entered is that packet data is being received over a network coincidentally. In this case, a time elapsing until a redetermination is set shorter than that in the case of a print job being executed.

In addition, the CPU 25 may set a time, which is preset by a user, as a time elapsing until a redetermination.

When the reason why the power-supply off state in the fast-startup available mode fails to be entered is occurrence of a failure in a peripheral device, the CPU 25 may restart the peripheral device and may then perform a redetermination. For example, when the power-supply off state in the fast-startup available mode fails to be entered due to occurrence of some error in the image reading unit 13, power supply of the image reading unit 13 is turned off temporarily, and is turned on again to restart the image reading unit 13, which may address the error. Therefore, if a redetermination is performed after the peripheral device is restarted, the power-supply off state in the fast-startup available mode may be allowed to be entered.

When, in response to reception of an instruction, through a user's direct operation on the UI device 12, to enter the power-supply off state, the CPU 25 determines that the power-supply off state in the fast-startup available mode fails to be entered, the CPU 25 may cause the power-supply off state in the partial power-supply off mode to be entered without a redetermination. When, in response to reception of an instruction, through remote control, to enter the power-supply off state, the CPU 25 determines that the power-supply off state in the fast-startup available mode fails to be entered, the CPU 25 may perform a redetermination.

When a user, who is in front of the image forming apparatus 10, operates the UI device 12 such as the operation panel directly to give an instruction to enter the power-supply off state, the user may want to cause a transition to the power-supply off state to be made immediately. For example, when the outlet plug of the image forming apparatus 10 is to be pulled off to move the image forming apparatus 10 to a different location, the user, who operates the power supply switch, wants to cause the power-supply off state to be entered immediately.

That is, when a user is present in front of or near the image forming apparatus 10, the power-supply off state may be entered in a short time without a redetermination if possible.

Therefore, the CPU 25 may set the repetition count of redetermination, which is performed when, in response to reception of an instruction, through a user's operation, to enter the power-supply off state, the CPU 25 determines that the power-supply off state in the fast-startup available mode fails to be entered, less than the repetition count of redetermination, which is performed when, in response to reception of an instruction, through remote control, to enter the power-supply off state, the CPU 25 determines that the power-supply off state in the fast-startup available mode fails to be entered.

For example, when an instruction to enter the power-supply off state is given through a direct operation on the UI device 12 such as an operation panel, the redetermination count may be set to one. When a user gives an instruction to enter the power-supply off state through remote control, the redetermination count may be set to more than one.

The image forming apparatus 10 may include a human detecting sensor which detects whether a user is present near the apparatus. In this case, after an instruction to enter the power-supply off state is received through a user's operation, when the human detecting sensor has not detected presence of the user, the CPU 25 may set the repetition count of redetermination, which is performed when the CPU 25 determines that the power-supply off state in the fast-startup available mode fails to be entered, more than that in the case where the human detecting sensor detects presence of the user.

That is, even when a user operates the UI device 12 such as an operation panel directly to give an instruction to enter the power-supply off state, if the human detecting sensor has not detected presence of the user, that is, it is detected that the user has left the image forming apparatus 10, necessity of immediately entering the power-supply off state may be reduced. If a time elapsing until a redetermination is made long, a problem may be less likely to occur.

Operations of the image forming apparatus 10 according to the present exemplary embodiment will be described in detail by referring to drawings.

The case in which a user directly sets the redetermination count and a set time for waiting for a redetermination will be described.

Figure 8:
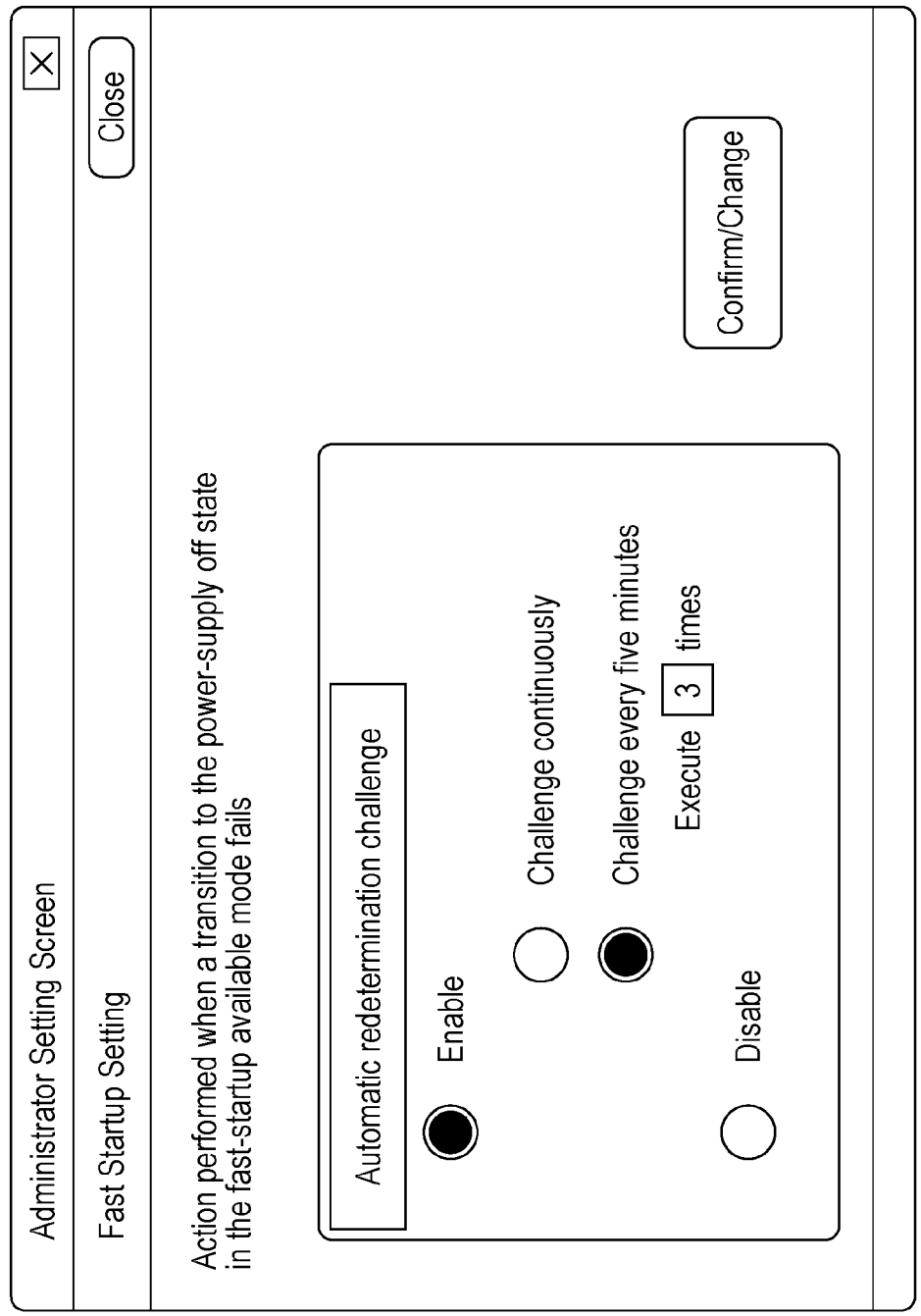
FIG. 8 is a diagram illustrating an exemplary display screen on an operation panel, which is used when settings for execution of a redetermination about whether a transition to the power-supply off state in the fast-startup available mode is allowed are to be set.

For example, a user sets the count of redeterminations and a time for waiting for a redetermination, on the display screen illustrated in FIG. 8. In the exemplary display screen on the operation panel illustrated in FIG. 8, the case in which a user sets a setting of performing three redeterminations at intervals of five minute is illustrated.

The operations, in which a redetermination is performed after a lapse of a set time and which are performed when a transition to the power-supply off state in the fast-startup available mode fails at the time when an instruction to enter the power-supply off state is given, will be described by referring to the flowchart in FIG. 9.

Figure 5:
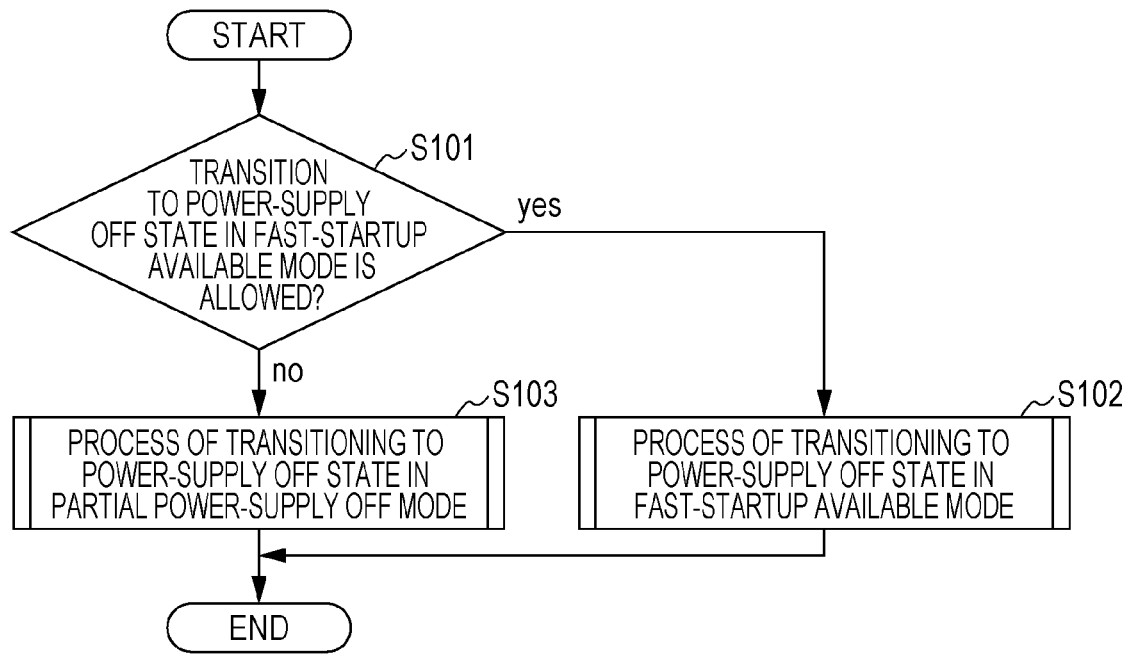
FIG. 5 is a flowchart for describing the overview of operations performed when a CPU is given an instruction to enter the power-supply off state.
Figure 6:
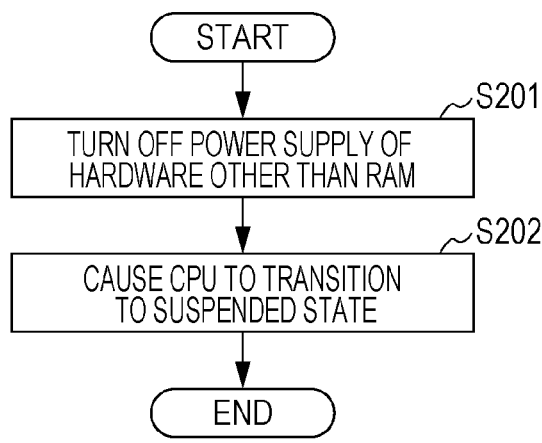
FIG. 6 is a flowchart for describing details of a transition process which is illustrated in the flowchart in FIG. 5 and which is performed when the CPU causes a transition to the power-supply off state in the fast-startup available mode to be made.
Figure 9:
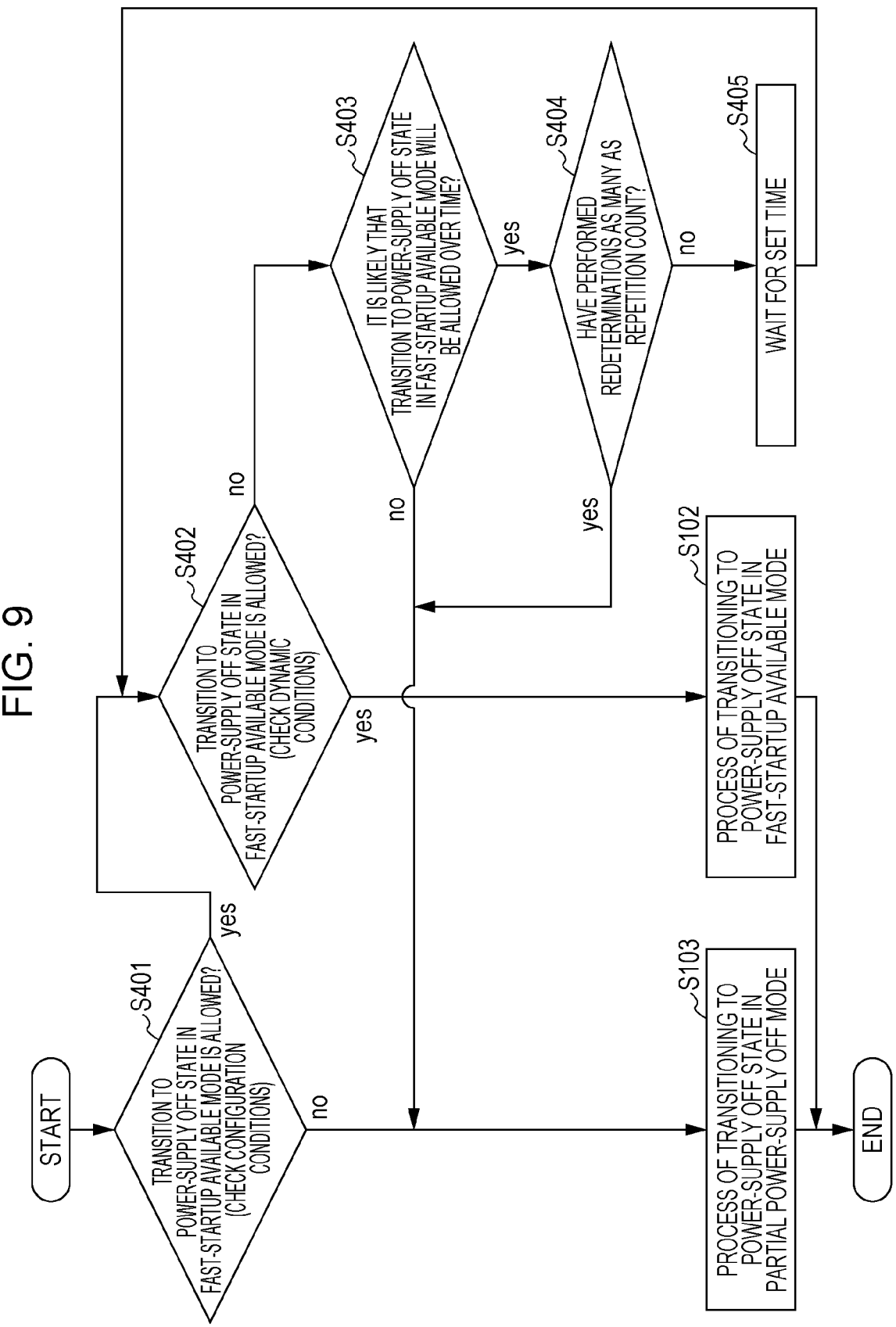
FIG. 9 is a flowchart for describing operations in which, if a transition to the power-supply off state in the fast-startup available model fails when an instruction to enter the power-supply off state is given, a redetermination is performed after a lapse of a set time.

The processes in steps S102 and S103 in the flowchart in FIG. 9 are the same as those illustrated in the flowchart in FIG. 5, and thus will not be described. In the description below, entering the power-supply off state may be expressed as transitioning to the power-supply off state. The difference is only in expression, and the two expressions have the substantially the same meaning.

When an instruction to enter the power-supply off state is given through a user's operation on the power supply switch, in step S401, the CPU 25 determines whether a transition to the power-supply off state in the fast-startup available mode is allowed on the basis of the configuration conditions.

In step S401, if any of the configuration conditions is not satisfied and the CPU 25 determines that a transition to the power-supply off state in the fast-startup available mode is not allowed, in step S103, the CPU 25 performs a transition process of transitioning to the power-supply off state in the partial power-supply off mode, and a transition to the power-supply off state in the partial power-supply off mode is made.

Thus, assume the case in which a configuration condition, such as a condition that a wireless communication line is not enabled, is not satisfied. In this case, even if a redetermination is performed after a lapse of the set time, it is less likely that the condition has been changed. Thus, when a configuration condition is not satisfied, a transition to the power-supply off state in the partial power-supply off mode is made without a redetermination.

In step S401, if all the configuration conditions are satisfied and the CPU 25 determines that a transition to the power-supply off state in the fast-startup available mode is allowed, in step S402, the CPU 25 determines whether a transition to the power-supply off state in the fast-startup available mode is allowed on the basis of the dynamic conditions.

In step S402, if all the dynamic conditions are satisfied and the CPU 25 determines that a transition to the power-supply off state in the fast-startup available mode is allowed, in step S102, the CPU 25 performs a transition process of transitioning to the power-supply off state in the fast-startup available mode, and causes the power-supply off state in the fast-startup available mode to be entered.

In step S402, if any of the dynamic conditions is not satisfied and the CPU 25 determines that a transition to the power-supply off state in the fast-startup available mode is not allowed, in step S403, the CPU 25 determines whether it is likely that the unsatisfied dynamic condition will be addressed over time, that is, it is likely that a transition to the power-supply off state in the fast-startup available mode will be allowed over time.

For example, when a sheet tray is pulled off temporarily from the image forming apparatus 10 and is then installed in the image forming apparatus 10, the sheet tray is lifted to a position at which sheets are feedable. When the sheet tray is being lifted at the time of determination about whether a transition to the power-supply off state in the fast startup available mode is allowed, the CPU 25 determines that it is likely that a transition to the power-supply off state in the fast-startup available mode will be allowed over time.

Examples of dynamic conditions, for which the CPU 25 determines that it is likely that a transition to the power-supply off state in the fast-startup available mode will be allowed over time, include a condition of determining whether an image output unit such as the image forming unit 15 is being set up for image quality adjustment, and a condition of determining whether a fixing device in the image forming unit 15 is being warmed up. The image forming apparatus 10 performs a setup operation in which the image forming unit 15 periodically adjusts image quality automatically for maintenance of the image quality. In addition, in the image forming apparatus 10, the image forming unit 15 may warm up the fixing device regularly to maintain the temperature of the fixing device, or may warm up the fixing device regularly for avoidance of condensation.

In step S403, if the CPU 25 determines that it is unlikely that a transition to the power-supply off state in the fast-startup available mode will be allowed over time, in step S103, the CPU 25 performs a transition process of transitioning to the power-supply off state in the partial power-supply off mode, and a transition to the power-supply off state in the partial power-supply off mode is made.

In step S403, if the CPU 25 determines that it is likely that a transition to the power-supply off state in the fast-startup available mode will be allowed over time, in step S404, the CPU 25 determines whether multiple redeterminations, as many as the specified repetition count, have been performed. If redeterminations, as many as the specified repetition count, have not been performed, in step S405, the CPU 25 waits for the set time. For example, when the set time is set to five minutes as in the exemplary operation screen in FIG. 8, the CPU 25 waits for five minutes.

After the CPU 25 waits for the specified time, in step S402, the CPU 25 determines again whether a transition to the power-supply off state in the fast-startup available mode is allowed on the basis of the dynamic conditions.

In step S402, if all the dynamic conditions are satisfied and the CPU 25 determines that a transition to the power-supply off state in the fast-startup available mode is allowed, in step S102, the CPU 25 performs a transition process of transitioning to the power-supply off state in the fast-startup available mode, and a transition to the power-supply off state in the fast-startup available mode is made.

Thus, the CPU 25 repeatedly performs processes in steps S402 to S405 multiple times as many as the repetition count, which has been set. In step S404, if the count of executed redeterminations reaches the repetition count, which has been set, the CPU 25 gives up a transition to the power-supply off state in the fast-startup available mode. Then, in step S103, the CPU 25 performs a transition process of transitioning to the power-supply off state in the partial power-supply off mode, and a transition to the power-supply off state in the partial power-supply off mode is made.

Operations, in which a redetermination is performed after an initialization process and which are performed when a transition to the power-supply off state in the fast-startup available mode fails at the time when an instruction to enter the power-supply off state is given, will be described by referring to the flowchart in FIG. 10.

For example, when a system error or a communication error occurs in the image forming apparatus 10, such an error is less likely to be addressed even after waiting for a set time. Therefore, when the reason why a transition to the power-supply off state in the fast-startup available mode fails is based on a dynamic condition that a system error, a communication error, or the like is occurring, the CPU 25 does not perform a redetermination after a lapse of a set time, and tries to address such an error by performing an initialization process. Then, the CPU 25 redetermines whether a transition to the power-supply off state in the fast-startup available mode is allowed.

Figure 10:
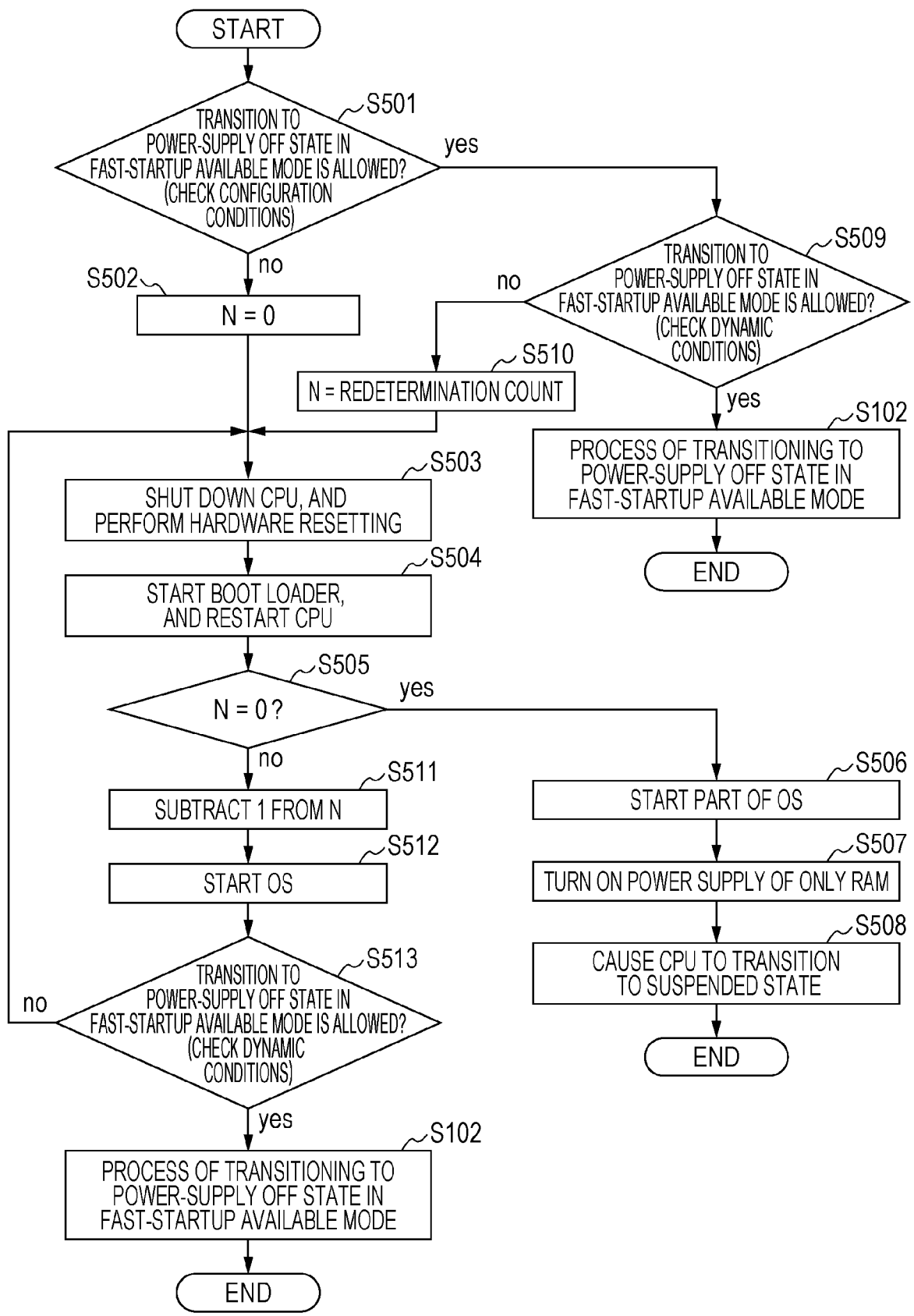
FIG. 10 is a flowchart for describing operations in which, if a transition to the power-supply off state in the fast-startup available mode fails when an instruction to enter the power-supply off state is given, a redetermination is performed after execution of an initialization process.

Also in the flowchart in FIG. 10, the processes in steps S102 and S103 are the same as those in the flowchart in FIG. 5, and will not be described.

When an instruction to enter the power-supply off state is given through a user's operation on the power supply switch, in step S501, the CPU 25 determines whether a transition to the power-supply off state in the fast-startup available mode is allowed on the basis of the configuration conditions.

In step S501, if any of the configuration conditions is not satisfied and the CPU 25 determines that a transition to the power-supply off state in the fast-startup available mode is not allowed, in step S502, the CPU 25 sets N to zero and sets the redetermination count to zero.

In step S503, the CPU 25 is shut down, and hardware resetting is performed in the controller 11.

In step S504, the boot loader starts up and the CPU 25 is restarted. In step S505, the CPU 25 determines whether N is equal to zero. At this point, N has been set to zero. Therefore, in step S506, the CPU 25 starts only a part of the OS.

After that, in step S507, power supply of only the RAM 24 is turned on in the controller 11. In step S508, the CPU 25 transitions to the suspended state, and the image forming apparatus 10 enters the power-supply off state in the partial power-supply off mode.

In step S501, if all the configuration conditions are satisfied and the CPU 25 determines that a transition to the power-supply off state in the fast-startup available mode is allowed, in step S509, the CPU 25 determines whether a transition to the power-supply off state in the fast-startup available mode is allowed on the basis of the dynamic conditions.

In step S509, if all the dynamic conditions are satisfied and the CPU 25 determines that a transition to the power-supply off state in the fast-startup available mode is allowed, in step S102, the CPU 25 performs a transition process of transitioning to the power-supply off state in the fast-startup available mode, and causes the power-supply off state in the fast-startup available mode to be entered.

In step S509, if any of the dynamic conditions is not satisfied and the CPU 25 determines that a transition to the power-supply off state in the fast-startup available mode is not allowed, in step S510, the CPU 25 sets N to the redetermination count. In the case where the redetermination is performed after execution of the initialization process, even if multiple redeterminations are performed, it is highly likely that the determination results are the same. Thus, in this example, the case in which the redetermination count is set to one will be described.

In step S503, the CPU 25 is shut down, and hardware resetting is performed in the controller 11.

In step S504, the boot loader starts up and the CPU 25 is restarted. In step S505, the CPU 25 determines whether N is equal to zero. At this point, N has been set to one. Thus, in step S511, the CPU 25 subtracts one from N. As a result, N is equal to zero.

In step S512, the CPU 25 starts the OS. In step S513, the CPU 25 determines again whether a transition to the power-supply off state in the fast-startup available mode is allowed on the basis of the dynamic conditions. In steps S503 and S504, the CPU 25 is initialized and hardware resetting is performed in the image forming apparatus 10. Therefore, when the reason why a transition to the power-supply off state in the fast-startup available mode fails is, for example, occurrence of a system error, this reason may be addressed.

As a result, in step S513, if all the dynamic conditions are satisfied and the CPU 25 determines that a transition to the power-supply off state in the fast-startup available mode is allowed, in step S102, the CPU 25 performs a transition process of transitioning to the power-supply off state in the fast-startup available mode, and causes the power-supply off state in the fast-startup available mode to be entered.

In step S513, if any of the dynamic conditions is not satisfied and the CPU 25 determines that a transition to the power-supply off state in the fast-startup available mode is not allowed even in the redetermination, the CPU 25 causes the process to return to step S503 in which a shutdown process and hardware resetting are performed. Since N is equal to zero in the determination process in step S505, after that, the processes in steps S506 to S508 are performed, and the power-supply off state in the partial power-supply off mode is entered.

In the above-described method of performing redetermination, the description is made under the assumption that a user presets the set time, for which waiting is performed until a redetermination, and the repetition count of redeterminations.

However, the set time, for which waiting is performed until a redetermination, that is, the standby time, and the repetition count of redeterminations may be set in accordance with the type of reason why a transition to the power-supply off state in the fast-startup available mode fails.

For example, a redetermination management table in FIG. 11 and a redetermination parameter modification table in FIG. 12 are stored in the nonvolatile storage device 22. When the CPU 25 determines that a transition to the power-supply off state in the fast-startup available mode is not allowed, the standby time until a redetermination and the repetition count of redeterminations may be determined in accordance with the type of the reason why the transition is not allowed.

For example, when the CPU 25 determines that a transition to the power-supply off state in the fast-startup available mode is not allowed, if the reason why the transition is not allowed is that a sheet tray is being lifted, the standby time until a redetermination is set to 10 seconds, and the repetition count of redeterminations is set to four.

At that time, on the basis of how an instruction to turn off power supply is given, the standby time until a redetermination and the repetition count of redeterminations may be modified by using the redetermination parameter modification table in FIG. 12. For example, in the state in which a setting of "enabling" execution of a redetermination has been set, when an instruction to turn off power supply is given through an operation panel, the table values are halved. Specifically, assume the case in which the reason why a transition is not allowed is that a sheet tray is being lifted. On the basis of the table in FIG. 11, the standby time until a redetermination has been set to 10 seconds, and the repetition count of redeterminations has been set to four. However, in this case, these values are halved: the standby time until a redetermination is modified to five seconds; the repetition count of redeterminations is modified to two.

When the reason why a transition to the power-supply off state in the fast-startup available mode is not allowed is reception of packet data through a network, the amount of packet data to be received is often not large. If a response is transmitted after completion of reception of packet data, the process is complete. Therefore, in this case, it is highly likely that a transition to the power-supply off state in the fast-startup available mode is allowed when a redetermination is performed after a waiting period of several seconds.

When a process caused by a timer interruption is being performed, if the process has such type that it ends immediately, control may be exerted so that a redetermination is performed after waiting for a while. For example, if the timer interruption causes the state to be stored regularly, the timer interruption ends immediately. Thus, after waiting for a certain time, a redetermination may be performed. Other examples of a process caused by a timer interruption include a function of performing a memory leak diagnosis in an idle time, a function of clearing unnecessary data in an HDD in an idle time, and a function of regularly notifying an external server of information about the image forming apparatus 10.

However, if a process caused by a timer interruption is a job, such as time-designated printing or time-designated faxing, the time until the end of the process is not known. Thus, when an instruction to transition to the power-supply off state is given, a transition to the power-supply off state in the partial power-supply off mode may be made immediately without a redetermination.

Typically, when an instruction to transition to the power-supply off state is given during execution or reception of a print job, the execution or reception of a print job may be stopped, and a transition to the power-supply off state in the partial power-supply off mode may be made immediately. This is because, if completion of execution or reception of a print job is waited for, the time until the completion is unknown, and a user, who has given the instruction to enter the power-supply off state, may be waited for a long time.

However, in the case of a remote power-supply off operation, which is an instruction, through remote control, to enter the power-supply off state, and a time-designated power-supply off operation, the user is not present in front of the apparatus. Thus, in some cases, it may be better that a redetermination is performed after a lapse of some standby time, and that a transition to the power-supply off state in the fast-startup available mode is made. Further, when a transition to the power-supply off state in the fast-startup available mode fails due to reception of a fax, which is performed at the time when an instruction to enter the power-supply off state is given, a user is not present in front of the apparatus and the job is performed on the basis of reception from the outside. Thus, after waiting for a certain time, a redetermination may be performed, and a transition to the power-supply off state in the fast-startup available mode may be made.

For each type of the reason why it is determined that a transition to the power-supply off state in the fast-startup available mode is not allowed, for example, the following items may be set in the redetermination management table in FIG. 11: whether a redetermination is to be performed; whether a redetermination is to be performed after a lapse of a set time; and whether a redetermination is to be performed after rebooting and an initialization process.

If a user may change the attribute values in the "action performed when transition fails" field in the tables in FIGS. 11 and 12, for each of the reasons why a transition is not allowed and for each of the power-supply off methods, whether a redetermination is to be performed may be switched in accordance with how to use the image forming apparatus 10. For example, assume a user who operates the image forming apparatus 10 in such a manner that, after a remote power-supply off operation, a power breaker is turned off to interrupt power supply to the image forming apparatus 10. For such a user, a redetermination after a remote power-supply off operation is not necessary. Therefore, such a user may set the attribute value of the "action performed when transition fails" field for a remote power-supply off operation, to "no execution of redetermination".

In the embodiments above, the term "processor" refers to hardware in a broad sense. Examples of the processor include general processors (e.g., CPU) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Modified Examples

In the exemplary embodiment described above, the case in which the image forming apparatus 10 enters the power-supply off state from the normal operation state is described. However, the present disclosure is not limited to this. The present disclosure may be similarly applied to the case in which other information processing apparatuses, such as a personal computer and a portable terminal apparatus, for example, a smartphone, enter the power-supply off state from the normal operation state.

In the exemplary embodiment described above, the following operations are described: when the power supply switch 14, which is formed of hardware, is operated, the power-supply off state in the full power-supply off mode is entered; when the software power supply switch on the operation panel is operated, the power-supply off state in the partial power-supply off mode or the power-supply off state in the fast-startup available mode is entered. However, the present disclosure is not limited to this case.

The present disclosure may be applied also to the case in which the following control is exerted: in the case where multiple power supply switches are present, when a specific power supply switch is operated, it is determined whether the power-supply off state in the partial power-supply off mode or the power-supply off state in the fast-startup available mode is to be entered; when a power supply switch other than the specific power supply switch is operated, such determination is not made, and a transition to a specific power-supply off state is made.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:
1. An information processing apparatus comprising:
a processor configured to:
control an operation of the information processing apparatus by executing a control program;
in response to reception of an instruction to enter a power-supply off state, determine whether a first power-supply off state is allowed to be entered, the first power-supply off state being a state in which the operation is stopped while a current operation state is suspended without execution of a restart of the control program;
in response to a determination result indicating that the first power-supply off state fails to be entered, perform a redetermination after a lapse of a set time, the redetermination determining whether the first power-supply off state is allowed to be entered;
in response to the redetermination determining that the first power-supply off state is allowed to be entered, cause the first power-supply off state to be entered, and, in response to the redetermination determining that the first power-supply off state is not allowed to be entered, cause a second power-supply off state to be entered, the second power-supply off state being a state in which the operation is stopped after the control program is restarted and an initialization process is performed;
repeatedly perform the redetermination multiple times, the redetermination determining whether the first power-supply off state is allowed to be entered, the redetermination being performed when a repeated set interval of time has elapsed; and in response to performing the redetermination at a first repetition count or a second repetition count multiple times, causing the second power-supply off state to be entered, set the first repetition count of the redetermination less than the second repetition count of the redetermination, the redetermination for the first repetition count being performed when, in response to reception of a first instruction to enter the power-supply off state, it is determined that the first power-supply off state is not allowed to be entered, the first instruction being given through a user's operation on the information processing apparatus, the redetermination for the second repetition count being performed when, in response to reception of a second instruction to enter the power-supply off state, it is determined that the first power-supply off state is not allowed to be entered, the second instruction being given through remote control.

2. The information processing apparatus according to claim 1,
wherein the processor is configured to:
when a reason why the first power-supply off state is not allowed to be entered is a reason addressed over time, perform the redetermination.

3. The information processing apparatus according to claim 1,
wherein the processor is configured to:
set a time elapsing until execution of the redetermination, the setting being performed in accordance with a type of a reason why the first power-supply off state is not allowed to be entered.

4. The information processing apparatus according to claim 1,
wherein the processor is configured to:
set a preset time as a time elapsing until execution of the redetermination, the preset time being set by a user.

5. The information processing apparatus according to claim 1,
wherein the processor is configured to:
when, in response to reception of an instruction to enter the power-supply off state, it is determined that the first power-supply off state is not allowed to be entered, cause the second power-supply off state to be entered without execution of the redetermination, the instruction being given through a user's operation.

6. The information processing apparatus according to claim 5,
wherein the processor is configured to:
when, in response to reception of an instruction to enter the power-supply off state, it is determined that the first power-supply off state is not allowed to be entered, perform the redetermination, the instruction being given through remote control.

7. The information processing apparatus according to claim 1, further comprising:
a human detecting sensor that detects whether a user is present near the information processing apparatus,
wherein the processor is configured to:
when the human detecting sensor does not detect presence of the user after reception of an instruction, through the user's operation, to enter the power-supply off state, set a third repetition count of the redetermination greater than a fourth repetition count, the redetermination for the third repetition count being performed in response to a determination result indicating that the first power-supply off state is not allowed to be entered, the fourth repetition count being set in the case where the human detecting sensor detects presence of the user.

8. An information processing apparatus comprising:
a processor configured to:
control an operation of the information processing apparatus by executing a control program;
in response to reception of an instruction to enter a power-supply off state, determine whether a first power-supply off state is allowed to be entered, the first power-supply off state being a state in which the operation is stopped while a current operation state is suspended without execution of a restart of the control program;
in response to a determination result indicating that the first power-supply off state fails to be entered, perform a redetermination after a lapse of a set time, the redetermination determining whether the first power-supply off state is allowed to be entered;
in response to the redetermination determining that the first power-supply off state is allowed to be entered, cause the first power-supply off state to be entered, and, in response to the redetermination determining that the first power-supply off state is not allowed to be entered, cause a second power-supply off state to be entered, the second power-supply off state being a state in which the operation is stopped after the control program is restarted and an initialization process is performed; and
when a reason why the first power-supply off state is not allowed to be entered is occurrence of a failure in a peripheral device, restart the peripheral device and then perform the redetermination.

9. A non-transitory computer readable medium storing a program causing a computer to execute a process comprising:
controlling an operation of an apparatus by executing a control program;
in response to reception of an instruction to enter a power-supply off state, determining whether a first power-supply off state is allowed to be entered, the first power-supply off state being a state the operation is stopped while a current operation state is suspended without execution of a restart of the control program;
in response to a determination result indicating that the first power-supply off state fails to be entered, performing a redetermination after a lapse of a set time, the redetermination determining whether the first power-supply off state is allowed to be entered;
in response to the redetermination determining that the first power-supply off state is allowed to be entered, causing the first power-supply off state to be entered, and, in response to the redetermination determining that the first power-supply off state is not allowed to be entered, causing a second power-supply off state to be entered, the second power-supply off state being a state in which the operation is stopped after the control program is restarted and an initialization process is performed;
repeatedly performing the redetermination multiple times, the redetermination determining whether the first power-supply off state is allowed to be entered, the redetermination being performed when a repeated set interval of time has elapsed; and in response to performing the redetermination at a first repetition count or a second repetition count multiple times, causing the second power-supply off state to be entered, setting the first repetition count of the redetermination less than the second repetition count of the redetermination, the redetermination for the first repetition count being performed when, in response to reception of a first instruction to enter the power-supply off state, it is determined that the first power-supply off state is not allowed to be entered, the first instruction being given through a user's operation on the apparatus, the redetermination for the second repetition count being performed when, in response to reception of a second instruction to enter the power-supply off state, it is determined that the first power-supply off state is not allowed to be entered, the second instruction being given through remote control.

\* \* \* \* \*